US012574078B2

(12) United States Patent
Svendsen et al.

(10) Patent No.: US 12,574,078 B2
(45) Date of Patent: Mar. 10, 2026

(54) ANTENNA CIRCUITRY

(71) Applicant: Nokia Technologies Oy, Espoo (FI)

(72) Inventors: Simon Svendsen, Aalborg (DK);
Christian Rom, Aalborg (DK);
Samantha Caporal Del Barrio,
Aalborg (DK); Kim Nielsen, Storvorde
(DK)

(73) Assignee: Nokia Technologies Oy, Espoo (FI)

( * ) Notice: Subject to any disclaimer, the term of this
patent is extended or adjusted under 35
U.S.C. 154(b) by 10 days.

(21) Appl. No.: 18/441,060

(22) Filed: Feb. 14, 2024

(65) Prior Publication Data

US 2024/0275436 A1     Aug. 15, 2024

(30) Foreign Application Priority Data

Feb. 15, 2023   (EP) ..................................... 23156848

(51) Int. Cl.
  *H04B 7/04*       (2017.01)
  *H04B 1/04*       (2006.01)
  *H04B 1/18*       (2006.01)
  *H04B 7/0426*     (2017.01)

(52) U.S. Cl.
  CPC .............. *H04B 7/043* (2013.01); *H04B 1/04*
      (2013.01); *H04B 1/18* (2013.01)

(58) Field of Classification Search
  CPC ............. H04B 7/043; H04B 1/04; H04B 1/18
  USPC ......................................................... 375/262
  See application file for complete search history.

(56) References Cited

U.S. PATENT DOCUMENTS

| | | | | |
|---|---|---|---|---|
| 11,606,124 | B2 | 3/2023 | Svendsen et al. | |
| 12,160,292 | B2 | 12/2024 | Svendsen et al. | |
| 2012/0064825 | A1* | 3/2012 | Landon .................... | H04B 7/10 |
| | | | | 455/39 |
| 2013/0088391 | A1* | 4/2013 | Corman ............. | H04B 7/18515 |
| | | | | 342/365 |
| 2019/0267709 | A1* | 8/2019 | Mow ....................... | H01Q 21/24 |
| 2020/0091622 | A1* | 3/2020 | Turpin .................... | H01Q 5/42 |
| 2023/0155271 | A1* | 5/2023 | Yu ............................. | H01P 3/08 |
| | | | | 333/100 |

\* cited by examiner

*Primary Examiner* — Kevin M Burd
(74) *Attorney, Agent, or Firm* — McCarter & English,
LLP

(57)     ABSTRACT

An apparatus, including an antenna array of antenna elements having signal feeds configured to convey a pair of radio frequency signals related to a pair of polarised beams; and circuitry coupled to the signal feeds and configured to vary a gain of the pair of radio frequency signals conveyed between the signal feeds and front end circuitry to vary an orientation of the pair of polarised beams.

20 Claims, 9 Drawing Sheets a b

| Feed Point Power [dB] | | Feed Point Power [Linear] | | | |
|---|---|---|---|---|---|
| f1 | f2 | f1 | f2 | Polarization Tilt | |
| 23.0 dBm | 0 dBm (off) | 1 | 0 | 0° | X |
| 22.5 dBm | 13.0 dBm | 0.9 | 0.1 | 9° | X |
| 22.0 dBm | 16.0 dBm | 0.8 | 0.2 | 18° | X |
| 21.5 dBm | 17.8 dBm | 0.7 | 0.3 | 27° | X |
| 20.8 dBm | 19.0 dBm | 0.6 | 0.4 | 36° | + |
| 20.0 dBm | 20.0 dBm | 0.5 | 0.5 | 45° | + |

ANTENNA CIRCUITRY

TECHNOLOGICAL FIELD

Various example embodiments relate to the field of wireless communications and, particularly, to Multiple Input, Multiple Output (MIMO) technology.

BACKGROUND

Today's and future wireless communication systems, such as Long Term Evolution (LTE) or 5th Generation (5G), also referred to as New Radio (NR), have been envisaged to use MIMO multi-antenna transmission techniques. Constantly increasing requirements for high throughput motivates the wireless communication systems such as 5G to use the mmWave (millimeter wave) frequencies due to available high bandwidth. Usage of mmWave frequencies however poses new challenges on MIMO performance. Thus, factors such as environment changes or physical orientation of antennas will have an increased performance impact which needs to be taken into account for achieving desired performance.

BRIEF SUMMARY

The scope of protection sought for various example embodiments of the invention is set out by the independent claims. The example embodiments and features, if any, described in this specification that do not fall under the scope of the independent claims are to be interpreted as examples useful for understanding various embodiments of the invention.

According to various, but not necessarily all, example embodiments of the invention there is provided an apparatus, comprising an antenna array of antenna elements having signal feeds configured to convey a pair of radio frequency (RF) signals related to a pair of polarised beams; and circuitry coupled to the signal feeds and configured to vary a gain of the pair of radio frequency signals conveyed between the signal feeds and front end circuitry to vary an orientation of the pair of polarised beams.

The circuitry may be configured to vary the gain to vary the orientation of both of the pair of polarised beams together.

The circuitry may be configured to vary the gain to vary the orientation of both of the pair of polarised beams together by a same angle or a different angle.

The circuitry may be configured to vary a relative gain of the pair of radio frequency signals to vary the orientation of both of the pair of polarised beams.

The circuitry may be configured to vary the gain to vary the orientation of both of the pair of polarised beams together by an angle of up to 45°.

The circuitry may comprise transceiver circuitry configured to vary a gain of amplifiers conveying the pair of radio frequency signals to vary the orientation of the pair of polarised beams.

The circuitry may comprise transceiver circuitry configured to vary a gain of attenuators conveying the pair of radio frequency signals to vary the orientation of the pair of polarised beams.

The pair of RF signals may comprise a first radio frequency signal related to a first beam polarised in a first orientation and a second radio frequency signal related to a second beam polarised in a second orientation.

The circuitry may comprise a first path configured to convey the first radio frequency signal, a second path configured to convey the first radio frequency signal, a third path configured to convey the second radio frequency signal and a fourth path configured to convey the second radio frequency signal and the circuitry may be configured to vary a gain of the first path relative to the second path and to vary a gain of the third path relative to the fourth path to vary the orientation of the polarization of the first beam and the polarization of the second beam together.

The circuitry may be configured to split the first radio frequency signal into a pair of first radio frequency signals and to split the second radio frequency signal into a pair of second radio frequency signals, to vary a gain of one of the pair of first radio frequency signals relative to another of the pair of first radio frequency signals and to vary a gain of one of the pair of second radio frequency signals relative to another of the pair of second radio frequency signals to vary the orientation of the polarization of the first beam and the second beam together by a same angle.

The circuitry may comprise a first pair of radio frequency circuits, each coupled with a respective one of a first pair of feeds and configured to convey the first radio frequency signal between the first pair of feeds and the front end circuitry; and a second pair of radio frequency circuits, each coupled with a respective one of a second pair of feeds and configured to convey the second radio frequency signal between the second pair of feeds and the front end circuitry, the circuitry may be configured to vary of a relative gain within the first pair of radio frequency circuits and within the second pair of radio frequency circuits to vary the orientation of the polarization of the first beam and the second beam.

The circuitry may be configured to perform a reduction of gain of one of the first pair of radio frequency circuits compared to another of the first pair of radio frequency circuits and a reduction of gain of one of the second pair of radio frequency circuits compared to another of the second pair of radio frequency circuits to vary the orientation of the polarization of the first beam and the second beam.

The first pair of radio frequency circuits may comprise a first circuit and a second circuit, the first circuit being coupled with a first co-polarisation feed and the second circuit being coupled with a second co-polarisation feed, and wherein the second pair of radio frequency circuits may comprise a third circuit and a fourth circuit, the third circuit being coupled with a first cross-polarisation feed and the fourth circuit being coupled with a second cross-polarisation feed.

The fourth circuit may comprise a 180° phase shifter configured to provide a 180° phase shift in its signal being conveyed.

A decrease in relative gain may change the orientation of the pair of polarised beams in a first direction.

An increase in relative gain may change the orientation of the pair of polarised beams in a second direction.

The first direction may oppose the second direction. The first direction may be one of a clockwise and a counterclockwise direction and the second direction may be another of a clockwise and a counterclockwise direction.

The signal feeds may be located at positions on the antenna elements to provide the pair of polarised beams.

The polarised beams may be orthogonally-polarised beams.

The apparatus may comprise user equipment or a base station comprising circuitry configured to generate the radio frequency signals.

According to various, but not necessarily all, example embodiments of the invention there is provided an apparatus, comprising: an antenna array of antenna elements having signal feeds configured to convey a pair of radio frequency signals related to a pair of polarised beams; and circuitry coupled to the signal feeds and configured to convey the pair of radio frequency signals conveyed between the signal feeds and front end circuitry, the circuitry being configured to select between different signal feeds to vary an orientation of the pair of polarised beams.

The pair of radio frequency signals may comprise a first radio frequency signal related to a first beam polarised in a first orientation and a second radio frequency signal related to a second beam polarised in a second orientation.

The signal feeds may comprise a first plurality of signal feeds located to provide a first of the pair of polarised beams and a second plurality of signal feeds located to provide a second of the pair of polarised beams, the circuitry may be configured to select one of the first plurality of signal feeds with which to convey the first radio frequency signal and to select one of the second plurality of signal feeds with which to convey the second radio frequency signal to vary an orientation of the pair of polarised beams.

The polarised beams may be orthogonally-polarised beams.

The first plurality of signal feeds may be located at positions at or on the antenna element to provide a first polarisation and the second plurality of signal feeds may be located at positions at or on the antenna element to provide a second polarisation, wherein the first polarisation is orthogonal to the second polarisation.

The circuitry may be configured to select one of the first plurality of signal feeds with which to convey the first radio frequency signal and to select one of the second plurality of signal feeds with which to convey the second radio frequency signal at an associated position.

The polarised beams may be orthogonally-polarised beams.

The apparatus may comprise user equipment or a base station comprising circuitry configured to generate the radio frequency signals.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function. Likewise, circuitry may comprise means for performing a function.

BRIEF DESCRIPTION

Some example embodiments will now be described with reference to the accompanying drawings in which:

FIG. 1 illustrates polarization alignment/misalignment between a user equipment (UE) and a channel with a base station gNB a) Aligned polarizations. b) Misaligned polarizations;

FIG. 2 illustrates a reference standalone 1×4 antenna array. a) 1×4 antenna array with aligned patches. b) Combined power envelope radiation patterns for the 7 sweep stages c) Boresight configured Co-polarized radiation pattern. d) Combined power envelope radiation patterns for the 7 sweep stages;

DETAILED DESCRIPTION

Figure 1:
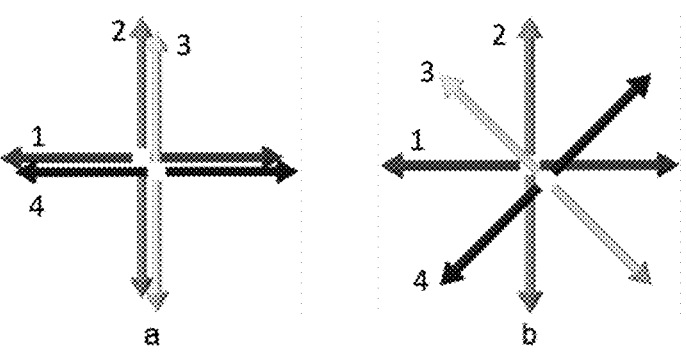

Before discussing the example embodiments in any more detail, first an overview will be provided. In one arrangement, circuitry conveying a pair of RF signals with an antenna varies the gain applied to those signals in order to vary, tilt or adjust the orientation of the polarization of a pair of beams associated with those RF signals. In another arrangement, circuitry conveying a pair of RF signals with an antenna switched between different feed points to vary, tilt or adjust the orientation of the polarization of a pair of beams associated with those RF signals. This enables the orientation of polarization of the pair of beams to be adjusted to improve throughput of user equipment and/or a base station.

MiMo Operation

Downlink (DL) and Uplink (UL) Multiple Input Multiple Output (MiMo) performance for mmWave frequency ranges (FR2) is envisioned to be implemented by using polarization split (co-polar & cross-polar) of antenna arrays at both the base station (gNB) and at the user equipment (UE). These antenna arrays can be dual feed as used in planar antennas, like patch antennas or planar inverted-F antennas (PIFAs). The reasoning behind this approach is to achieve high and similar antenna gain performance in both MiMo channels, while maintaining a compact spatial antenna design. Alternatively, the antenna array could use two monopoles, for example, each monopole being physically oriented relative to one another at 90 degrees to provide orthogonality. These are separate physical antennas with their own separate single feed, one being called the "co-polar feed" and the other being the "cross-polar feed". Each monopole is termed a "linearly polarized antenna", but when deployed together with each having different orthogonal polarizations then this provides the same result as a dual-polarized patch antenna. A patch design can be a quarter-wave or half-wave design, where the quarter-wave patch design has a discrete ground connection. Half-wave patch designs are typically used for mmWave array designs. As such, using two orthogonal linear monopoles might not necessarily use a much larger amount of space/volume. The needed de-correlation at the antenna arrays is obtained by ensuring that each antenna feed corresponds to a single polarization and that the resulting dual feed polarizations are designed to be orthogonal, i.e. designing the antenna array with a high Cross Polarization Discrimination (XPD). This approach will ensure full utilization of the two MiMo channels for Line of Sight (LoS) (or when the channel only consists of a single dominant cluster) operation provided that the maximum gain direction and the orientation of the orthogonal polarizations are aligned between the two antenna arrays. In addition, the high antenna gain requirements for FR2 frequencies will reduce the antenna radiation beam width, whereby beam steering at the antenna array is required to cover the needed angular space. The beam steering capabilities are typically implemented using tunable phase shifters at each element in the antenna array, whereby the direction of the beam can be controlled electrically (phased array) instead of mechanically. The XPD of any antenna depends on its radiation pattern and will change dynamically as a function of the Angle of Departure (AoD)/Angle of Arrival (AoA) and this dependency increases as the variations in the radiation pattern changes (antennas with an electrically large aperture) and as the radiation pattern is changed electrically using phase shifters or a butler matrix feeding structure: a higher antenna gain pattern leads to larger XPD variations, and phase controlled arrays lead to larger XPD variations. As such, the physical orientation of the UE antennas (due to a user moving/rotating the UE) will affect the MiMo throughput much more than what is seen at Sub6 GHz frequencies, where the antennas are static (no beam steering), the decorrelation at the UE is instead achieved by physical separation between two receiving antennas (each with random and different radiation patterns) and when the channel is rich on usable multi-path components.

Performance During Misalignment

In simulations, the DL 2×2 orthogonal MiMo signal is transmitted with perfect orthogonality, while the XPD (sometimes referred to as parallelity) of the receiver antenna is changed from being a perfectly aligned antenna (XPD equal to infinity→corresponding to a parallelity of 0→MiMo Rank 2) to maximum mismatch (XPD equal to 0 dB→corresponding to a parallelity of 1→MiMo Rank 1) as measured by the UE for DL 2×2 MiMo. The MiMo throughput is almost reduced by a factor of two when the high XPD is lost at the UE, since it can't distinguish the two MiMo channels from each other, as they are mixed at both receive (Rx)-chains and not each received separately on the Rx-chains. The polarization alignment/misalignment is illustrated in FIG. 1, where directions 3 and 4 represent the orthogonal polarizations of the antenna array at the UE and directions 1 and 2 represent the polarizations of the incoming orthogonal MiMo signal from the channel with the gNB. The aligned case in FIG. 1A will result in a high XPD while the misaligned case in FIG. 1B will result in a low XPD. There are different factors within the radio channel such as angular spread and cross polarization discrimination to name a few that may cause the effects seen in FIG. 1B.

Figure 2:
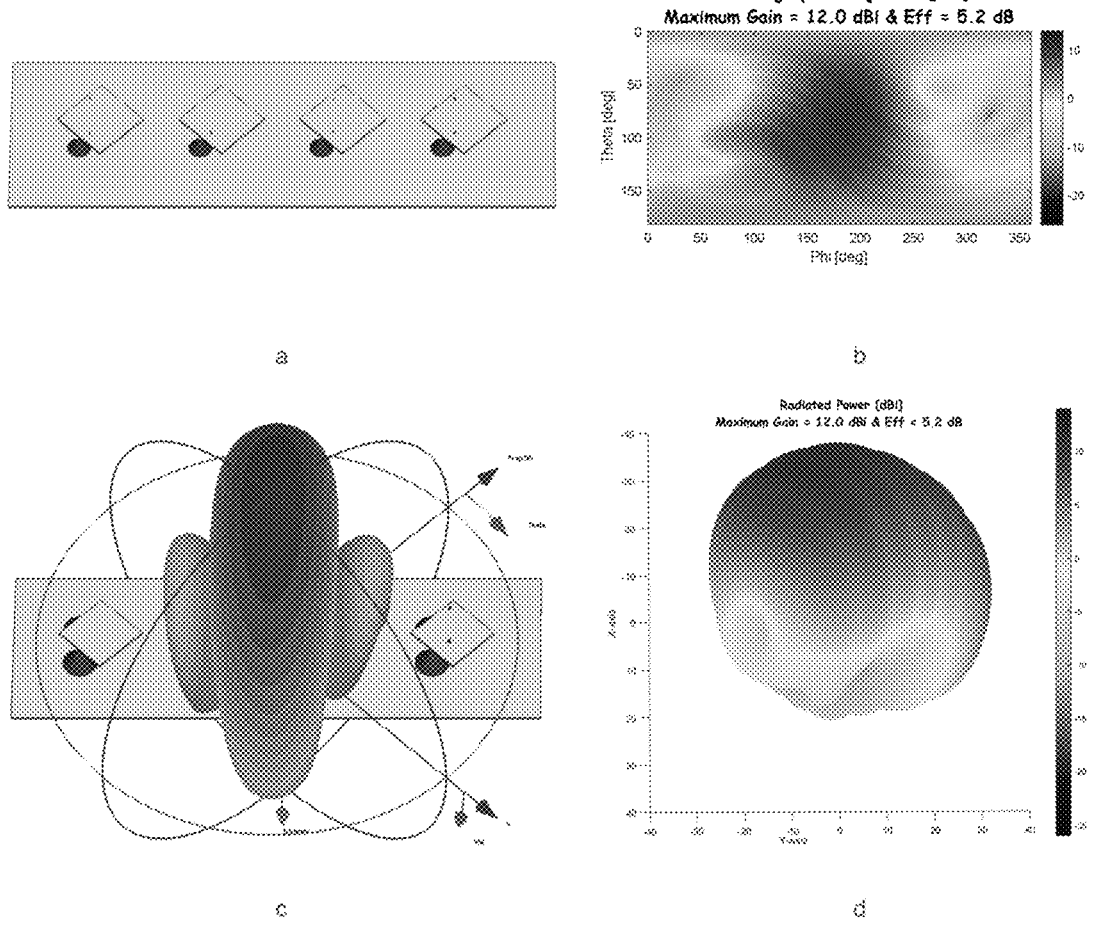
Figure 3:
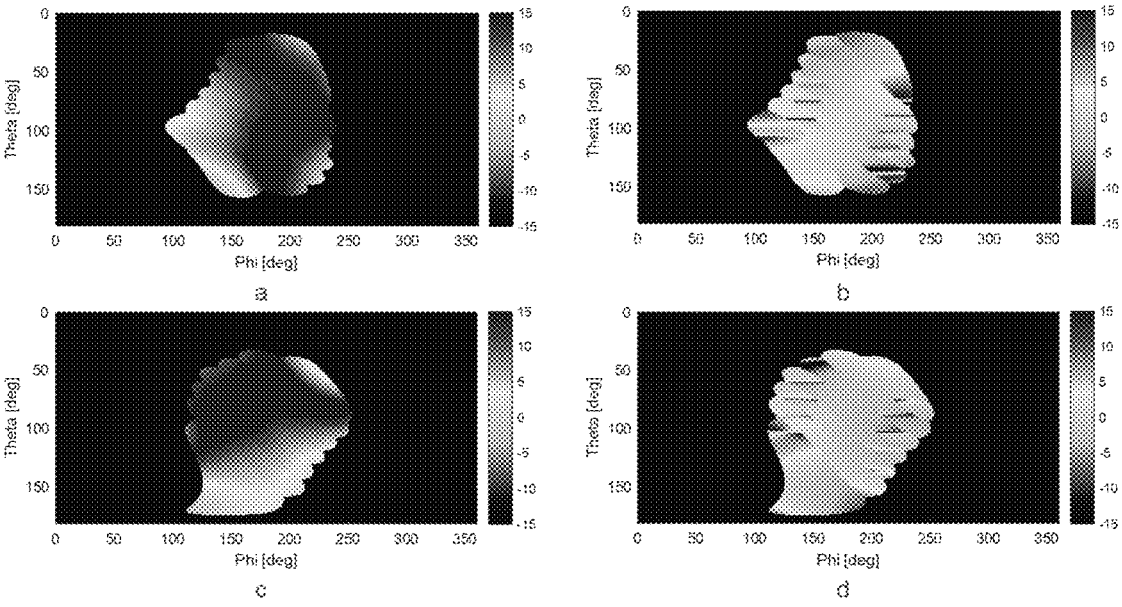
FIG. 3 illustrates simulated Cross Polarization Discrimination (XPD) as a function of Angle of Arrival (AoA) for the co-polarized receive (Rx)-chain at the UE. a) Max XPD for the co-polarization. b) Min XPD for the co-polarization. c) Max XPD for the cross-polarization. b) Min XPD for the cross-polarization.

The dynamic behavior of the XPD of a typical phased antenna array has been simulated in CST for a 1×4 stand-alone reference antenna array, as shown in FIG. 2A. The diamond shaped orientation of the patch antennas has been chosen to ensure a more symmetrical excitation of the two orthogonal polarizations (symmetric between the feeding points and the array structure). The boresight beam configuration is shown in FIG. 2C. The antenna is configured with 7 beam sweep stages to cover an angular space of +45°, where the envelope is illustrated in FIGS. 2B & 2D. The XPD of such a phased antenna array will depend on the AoA and the orientation (alignment) of the incoming orthogonal MiMo signals. The maximum XPD is simulated for perfectly aligned incoming orthogonal 2×2 MiMo signal, while minimum XPD is simulated with a 45° offset in alignment. The results are shown in FIG. 3 for all AoA's, where XPD values larger than 15 dB have been truncated to 15 dB (XPD values higher than 15 dB are considered sufficient for optimal MiMo throughput) and where XPD values where the corresponding gain value is lower than 6 dB from the maximum gain value (such low gain values is considered to be outside the operational area for that array) have been truncated to −15 dB. FIGS. 3A & 3B show the maximum (aligned as shown in FIG. 1A) and the minimum XPD (mis-aligned as shown in FIG. 1B) for the first polarization (co-pol) of the UE antenna array, while FIGS. 3C & 3D show the XPD values for the second polarization (cross-Pol).

The dependency between AoA, polarization alignment and XPD can be seen and a large difference between maximum and minimum XPD for the same AoA is also observed by comparing FIGS. 3A & 3B. In addition, the XPD of the two feed points (Co-Pol & Cross-Pol) of the UE antenna array will also vary independently, even for the same AoA by comparing FIGS. 3A & 3C, and antenna array feed points must have a high XPD to obtain an overall high MiMo Rank. Furthermore, the two feed points of the antenna array will be affected differently by the non-optimal surrounding environment where the antenna array is mounted, especially from the chassis and glass of the phone or housing of the user equipment. This will generate different radiation patterns, even with the same antenna array weights (amplitude (or power) and phase) and thereby directly affect the XPD.

Figure 4:
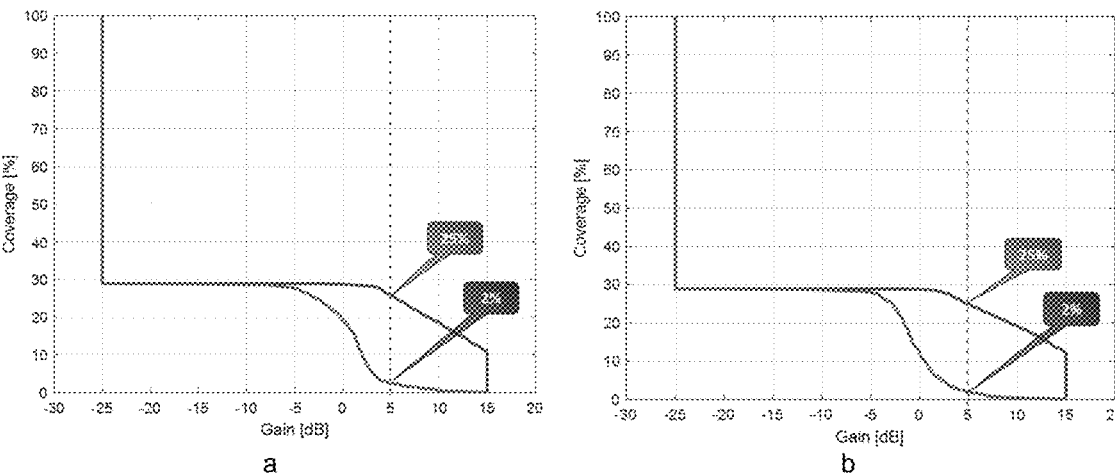
FIG. 4 illustrates Cumulative Distribution Function (CDF) curves of Maximum and Minimum XPD. a) Co-Polarization. b) Cross-Polarization.

The plots of FIG. 3 have been simplified and displayed as CDF curves in FIG. 4. XPD values larger than 5 dB (considered as the minimum XPD value for acceptable MiMo performance in this example, but other values can also be considered depending on the MiMo capabilities of the device) are only achieved for approximately 25% of the full angular space by a single antenna array when the array is perfectly aligned with the incoming orthogonal MiMo signal. This drops down to below 2% for the misaligned case with minimum XPD values. The two plots in FIG. 4 are almost identical due to the symmetrical excitation of the diamond shaped oriented patch antennas. An antenna array with square oriented patch antennas would result in a more asymmetrical excitation and behavior. However, the XPD must be better than 5 dB for both feed points (co- & cross-Pol) on the UE antenna array at that specific angular direction, to ensure acceptable MiMo (Rank 2) performance and this is only achieved for approximately 21% of the angular space for perfect alignment and way below 1% for worst-case misalignment (the combined XPD is not shown in FIG. 4, but calculated from the data used to generate the plots). Increasing the number of antenna arrays on the UE will also increase these XPD coverage values by approximately a multiplication factor equal to the number of antenna arrays. As such, a UE with three antenna arrays (a current 3GPP working assumption) could achieve an XPD coverage better than 5 dB close to 63% of the sphere when the incoming orthogonal MiMo signal is perfectly aligned with the antenna array at the UE, but this value is an absolute best case value for arrays with non-overlapping radiation patterns and this value will drop to below 1% for the worst case scenario with misaligned incoming orthogonal MiMo signal. It is evident that a typical phased antenna array, which will typically be implemented on a smart phone or other user equipment will have a limited angular space, which is also dependent on the orientation of the UE, where it can actually receive a 2×2 DL orthogonal MiMo signal with the needed decorrelation (5 dB XPD) between the two feed points in scenarios when the channel is dominated by a single cluster (like for example LOS). As such, the MiMo performance of a UE is very dependent on the alignment between the orientation of the polarization orthogonality of the channel and the polarization orthogonality of the used antenna array at the UE. This is particularly important for channels dominated by a single cluster, like LoS or single dominant cluster channels. Accordingly, some example embodiments seek to adaptively optimize the alignment of the polarization orthogonality at the UE antenna to that of the channel seen at the UE and thereby optimize the general MiMo performance.

The following describes in further detail suitable apparatus and possible mechanisms for implementing MIMO antenna array arrangements. While the following focuses on 5G networks, the embodiments as described further below are by no means limited to be implemented in said networks only, but they are applicable in any network incorporating MIMO antenna arrays.

Beam Tilting Control

Figure 5A:
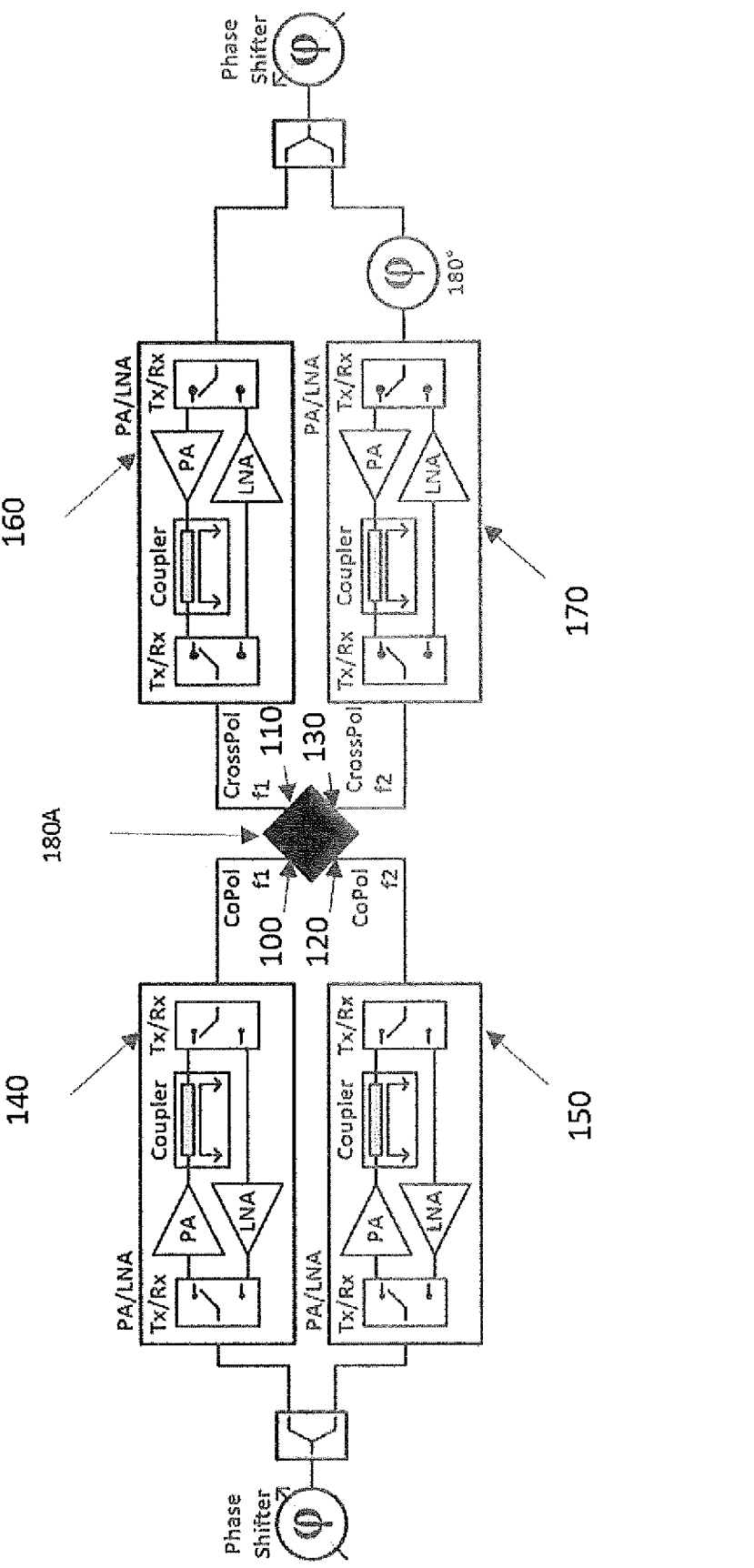
FIG. 5A illustrates circuitry for dynamic orientation control of orthogonal polarizations according to one example embodiment.
Figure 9:
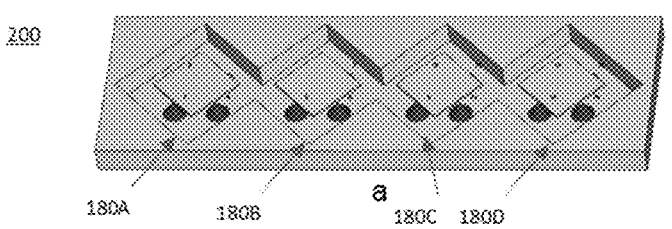
FIG. 9 illustrates used antenna arrays for the link budget simulations. a) UE antenna. b) Antenna emulating the channel seen by the UE.
Figure 9:
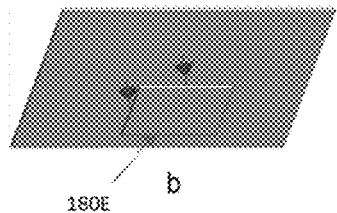

Some example embodiments enable the UE to adaptively align the orientation of the orthogonal polarizations excited on each patch antenna 180A-D in the antenna array 200 (see FIG. 9). FIG. 5A illustrates schematically an arrangement for a single patch antenna 180A of the antenna array 200 with four feeding points 100-130, each having dynamic power control for controlling the orientation of the orthogonal polarizations. The single patch antenna is a diamond shape and the four feeding points 100-130 are located on a respective side of the patch. This arrangement is typically duplicated for each patch antenna 180A-D. Although this embodiment uses a diamond patch antenna with feeding points located for a pair of orthogonal polarizations, it will be appreciated that this need not be the case and that other shaped patch antennas or even monopoles or dipoles can be provided with differently arranged feeding points to provide different polarization arrangements whose orientations can be controlled.

In overview, in this example embodiment, a co-pol signal is conveyed (either in transmission or reception) via a phase shifter, a splitter and via a first pair of RF circuits 140, 150 between front end circuitry (not shown) and feeding points 100, 120. A cross-pol signal is conveyed (either in transmission or reception) via a phase shifter, a splitter and via a second pair of RF circuits 160, 170 between front end circuitry (not shown) and feeding points 110, 130. One branch of the RF circuits 160, 170 is also provided with a 180° phase shifter. Switches within the first pair of RF circuits 140, 150 and the second pair of RF circuits 160, 170 configure for transmission or reception operation. In transmission, the switches are switched to convey the co-pol and the cross-pol signals via power amplifiers (PA). In reception, the switches are switched to convey the co-pol and the cross-pol signals via low noise amplifiers (LNA). By varying the relative gain between the RF circuits 140 & 150 and between the RF circuits 160 & 170, the orientation or tilt of the polarizations 10, 20 can be offset or varied between a 0° tilt (i.e. no angular offset) and a 45° tilt (i.e. a 45° angular offset). In particular, during transmission, by varying the relative gain of the power amplifier in the RF circuit 140 compared to the gain of the power amplifier in the RF circuit 150, and by varying the relative gain of the power amplifier in the RF circuit 160 compared to the gain of the power amplifier in the RF circuit 170, the orientation or tilt of the polarizations 10, 20 during transmission can be offset or varied. Similarly, during reception, by varying the relative gain of the low noise amplifier in the RF circuit 140 compared to the gain of the low noise amplifier in the RF circuit 150, and by varying the relative gain of the low noise amplifier in the RF circuit 160 compared to the gain of the low noise amplifier in the RF circuit 170, the orientation or tilt of the polarizations 10, 20 during reception can be offset or varied. Such control is typically performed by control circuitry (not shown).

Figure 8:
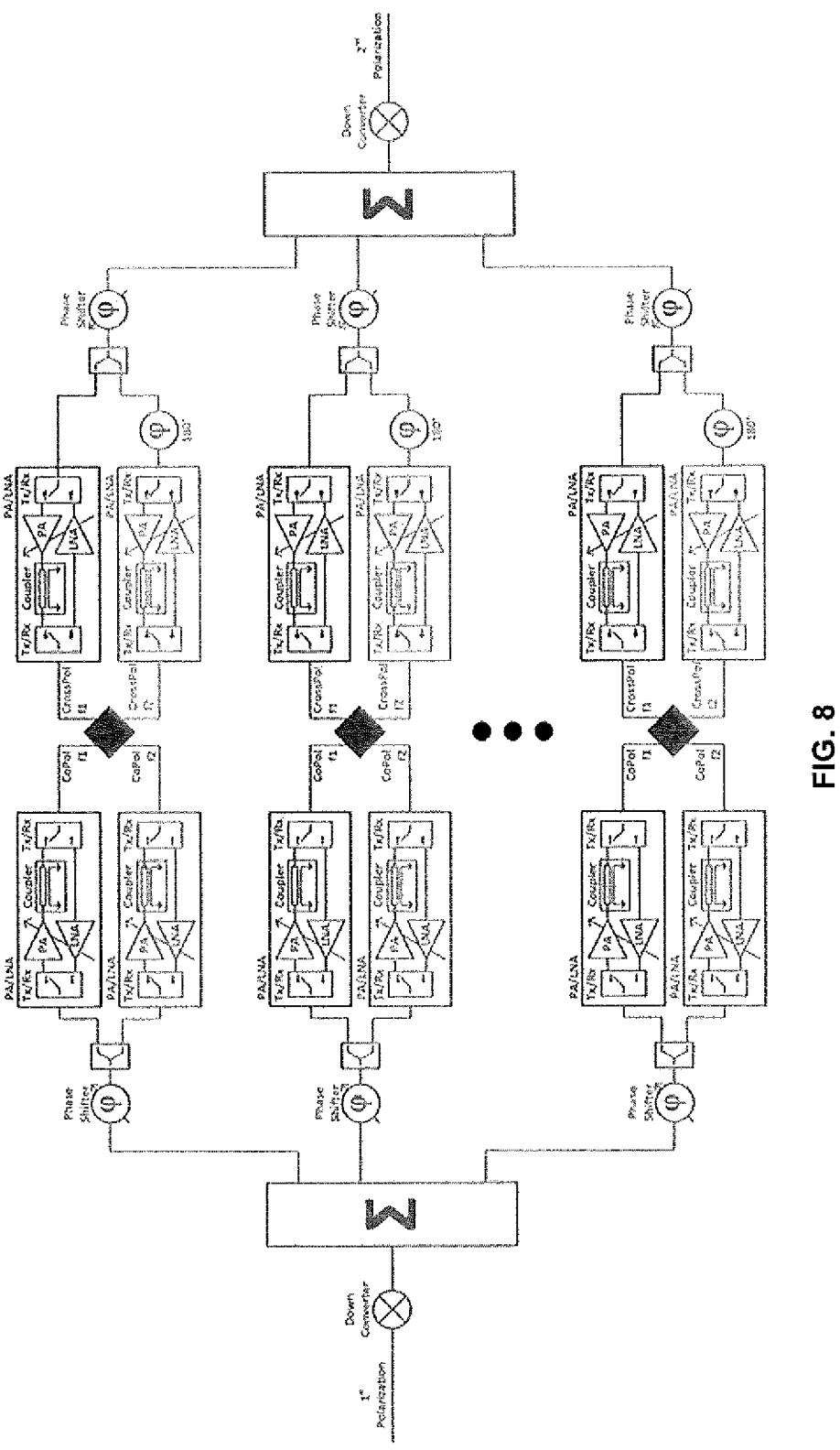
FIG. 8 shows how the circuitry is arranged to feed a complete antenna array.

FIG. 8 shows how the circuitry is arranged to feed a complete antenna array, with the first pair of RF circuits 140, 150 and the second pair of RF circuits 160, 170 duplicated for each patch antenna 180A-D.

Figure 5B:
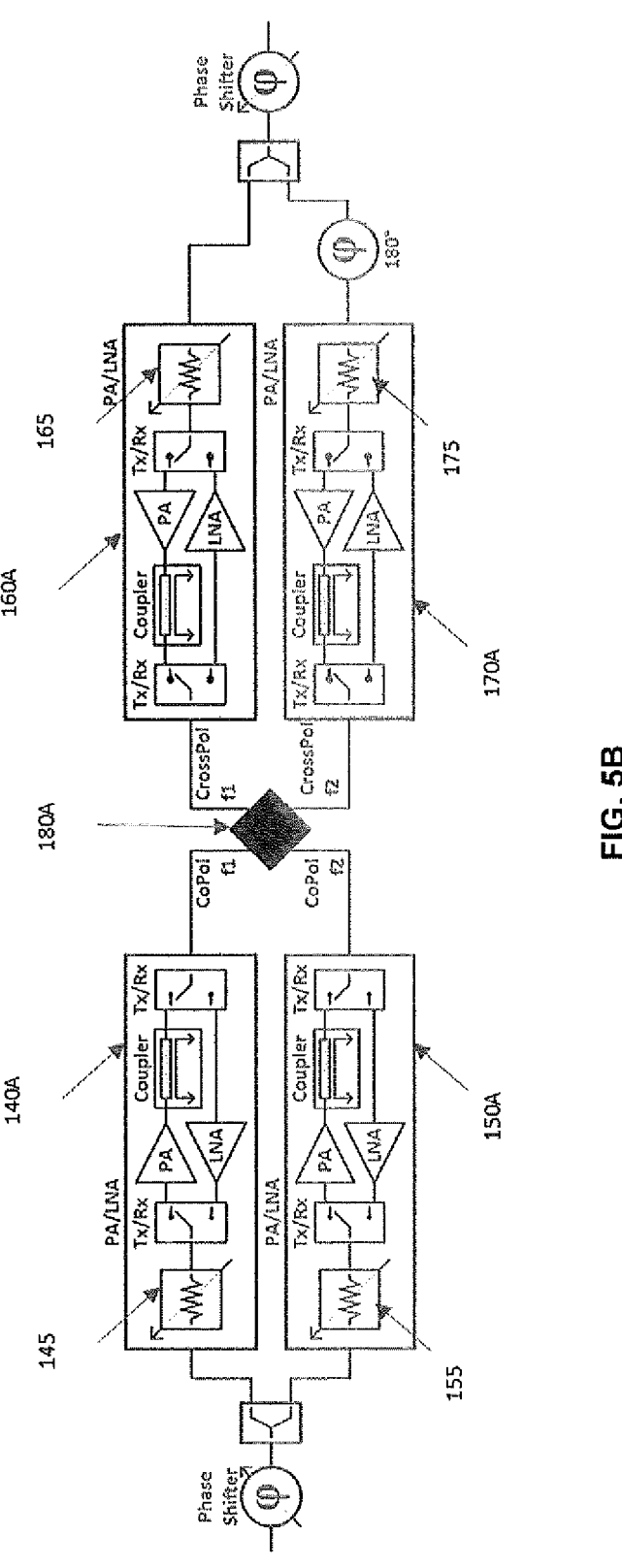
FIG. 5B illustrates circuitry for dynamic orientation control of orthogonal polarizations according to one example embodiment.

FIG. 5B shows an alternative example embodiment where attenuators 145, 155, 165, 175 are provided in the first pair of RF circuits 140A, 150A and the second pair of RF circuits 160A, 170A to change the relative gain between the RF circuits 140A & 150A and between the RF circuits 160A & 170A so that the orientation or tilt of the polarizations 10, 20 can be offset or varied between a 0° tilt (i.e. no angular offset) and a 45° tilt (i.e. a 45° angular offset). In particular, during transmission, by varying the relative attenuation of the attenuator 145 in the RF circuit 140A compared to the attenuation of the attenuator 155 in the RF circuit 150A, and by varying the relative attenuation of the attenuator 165 in the RF circuit 160A compared to the attenuation of the attenuator 175 in the RF circuit 170A, the orientation or tilt of the polarizations 10, 20 during transmission can be offset or varied. Similarly, during reception, by varying the relative attenuation of the attenuator 145 in the RF circuit 140A compared to the attenuation of the attenuator 155 in the RF circuit 150A, and by varying the relative attenuation of the attenuator 165 in the RF circuit 160A compared to the attenuation of the attenuator 175 in the RF circuit 170A, the orientation or tilt of the polarizations 10, 20 during reception can be offset or varied. Such control is typically performed by control circuitry (not shown). It will be appreciated that the arrangement of FIG. 5B could be used in combination with the arrangement of FIG. 5A.

Figures 6, 7:
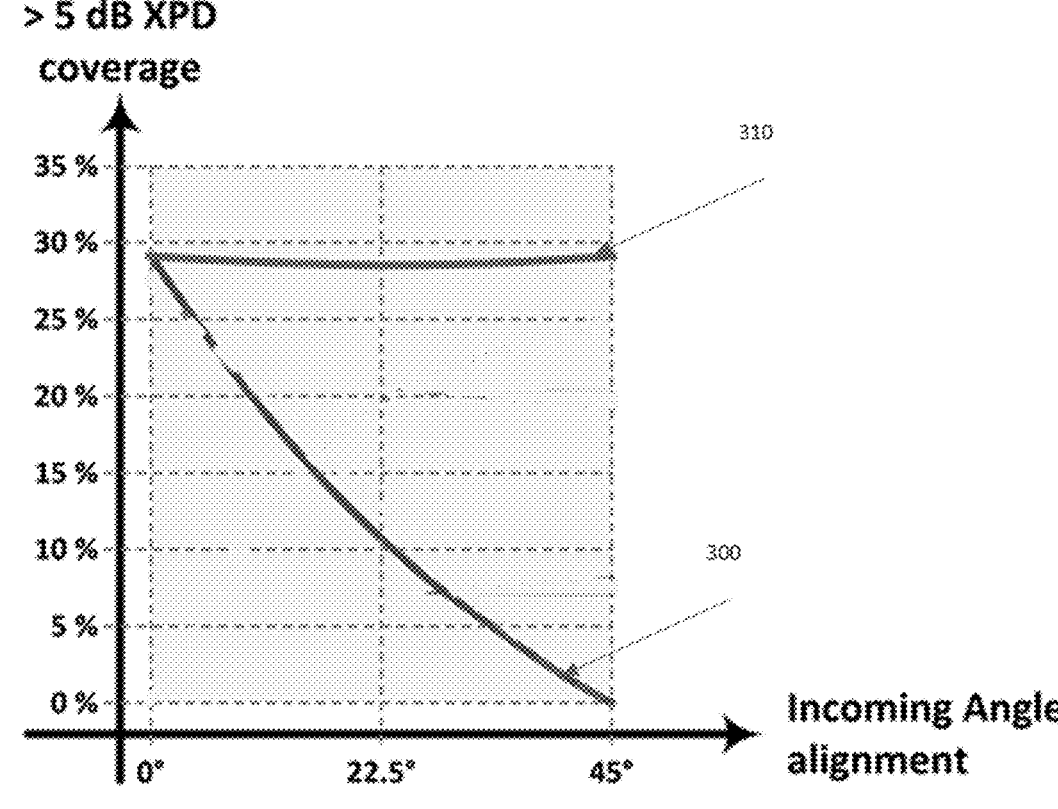
FIG. 6 shows amplification ratios between the two combined feed points per orientation.
FIG. 7 illustrates XPD (MiMo) performance improvement as a function of the alignment/misalignment of the orthogonality of the channel.

The orientation of the polarizations can be controlled by adjusting the amplification ratio in either downlink (using LNA) or uplink (using PA) between the two combined feeding points (f1 & f2) for each polarization (Co-Pol & Cross-Pol), as shown in FIG. 6 (the amplification numbers in FIG. 6 are shown for transmit (Tx), but the relative difference in dB is also valid for receive (Rx)).

The granularity of the amplification control will also influence the granularity of the orthogonal polarization tilt.

In addition, the orthogonality between the polarizations can be broken for this implementation if needed (e.g. if the channel is not orthogonal i.e. does not reflect each polarization with 90 degrees) by having different amplification ratios on the combined co- and cross-polarizations.

The configurability of the amplification can be implemented with a minimum of complexity, since the f2 paths need only to be adjustable in the RF (mmWave) domain:

The f2 paths are used to control the power ratio in the RF domain.

The amplification stages in the Intermediate Frequency (IF) domain can be used to control the combined power level for paths f1 and f2.

The controlling of the power/gain of the f2 paths, the relation between Co-Pol and Cross-Pol is the same for all the patch elements in the array, which means that only 1 control message is needed. Shifting from transmission (Tx) to reception (Rx) operation and assuming channel reciprocity, the same gain/attenuation configuration may be used, making it even further possible for combining and simplifying the circuitry that enables the dynamic power control that provides the polarization tilt.

The improvement in XPD performance of this novel antenna array implementation is illustrated in FIG. 7. The XPD coverage will gradually decrease from just below 30% to almost 0% for an existing array with fixed orthogonal polarizations, as shown with curve 300 in FIG. 7, as the alignment to the orthogonality of the channel changes. The performance improvement of utilizing adaptive orthogonal polarization alignment set out above is illustrated with the curve 310 in FIG. 7, where the XPD coverage is kept at maximum level for all alignments between the antenna array and the incoming orthogonal polarized MiMo signal. In addition, this improvement is obtained while maintaining maximum antenna gain. This implementation will ensure maximum throughput independent on the orientation of the channel orthogonality.

Accordingly, some example embodiments enable a MIMO 5G NR mmWave device to align the orientation of the excited orthogonal polarizations on its antenna array, to the orientation of the polarization orthogonality of the channel. Some example embodiments provide a hardware architecture which use four patch feeding points, combined in pairs with amplification control. This arrangement can also align the polarizations on the UE array even if the polarizations of the channel are no longer orthogonal, i.e. independent polarization control. This helps to ensure maximum MiMo Rank and throughput as supported by the channel. The maximum MiMo Rank is obtained with maximum antenna gain. MiMo Rank 2 with maximum antenna gain leads to maximum MiMo throughput. It is possible to align the orientation of the polarization orthogonality for any beam steering configuration.

Link Budget Simulation Results

The link budget-like simulations in CST ((Computer Simulation Technology) is a microwave electro-magnetic simulation software package) have been performed with the two antenna structures shown in FIG. 9, where the 1×4 array of patch antennas 180A-D is the UE antenna 200 and the single patch antenna 180E is used to emulate a single dominating cluster with orthogonal polarizations. The two antennas are placed 25 cm apart and the orientation of the orthogonal polarizations can be adjusted on both antennas. The relative short separation distance of 25 cm has been chosen to limit the number of mesh-cells in the simulation and thereby the PC (personal computer) hardware requirements for performing such simulation in CST. The far-field for a 1×4 antenna array, as used in these simulations is around 13 cm, so a separation of 25 cm will give valid results, but with significantly higher power levels than for a real use-case.

Figure 10:
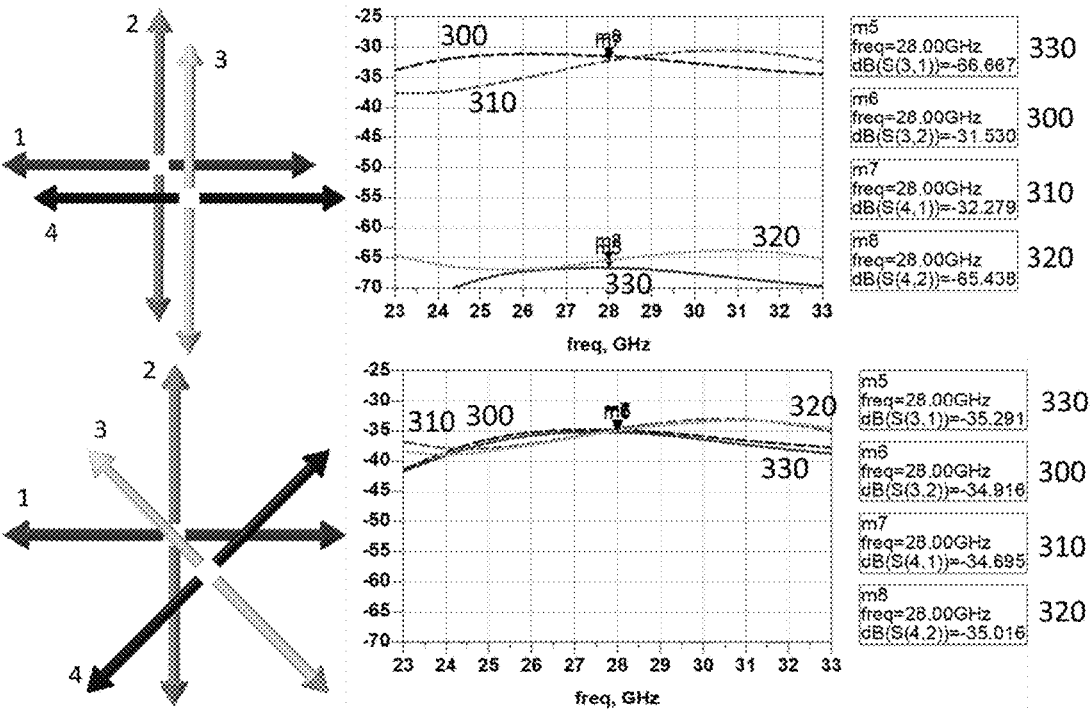
FIG. 10 shows link budget simulation results for a channel orthogonality of 0° & 90°. a&b) The orthogonal polarizations of the UE antenna are aligned with the channel. c&d) The orthogonal polarizations of the UE antenna are misaligned by 45° with the channel.
Figure 11:
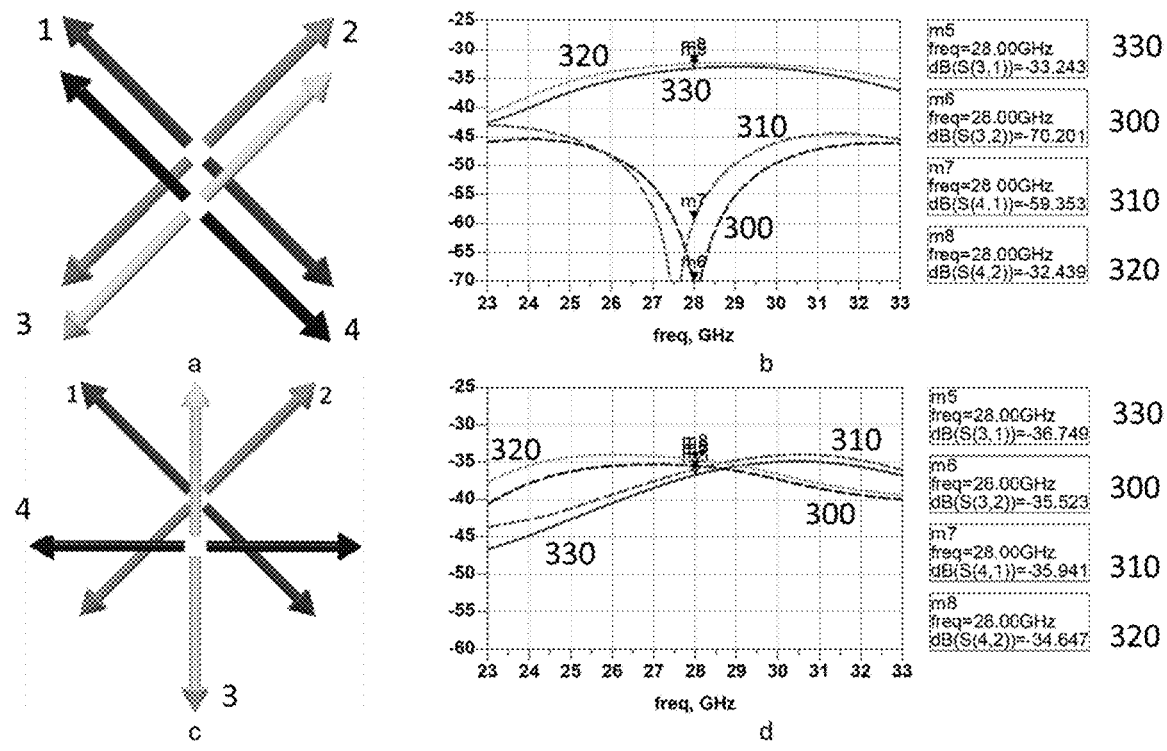
FIG. 11 shows link budget simulation results for a channel orthogonality of −45° & 45°. a&b) The orthogonal polarizations of the UE antenna are aligned with the channel. c&d) The orthogonal polarizations of the UE antenna are mis-aligned by 45° with the channel.

The orthogonal polarization alignment between the channel and the UE array are illustrated with arrows in FIGS. 10 and 11 where the channel is illustrated by arrows 1 & 2 and the UE array is illustrated by arrows 3 & 4. The results shown in FIG. 10 are for the situation where the orthogonality of the channel is 0° & 90. Line 320 (m8) shows the coupling from channel component 2 to antenna component 4, S42 or h42. Line 330 (m5) shows the coupling from channel component 1 to antenna component 3, S31 or h31. Line 300 (m6) shows the coupling from channel component 2 to antenna component 3, S32 or h32. Line 310 (m7) shows the coupling from channel component 1 to antenna component 4, S41 or h41.

The coupling (h matrix) between the different polarizations on the two different antennas are shown below:

$$\text{Aligned} \Rightarrow h = \begin{bmatrix} h_{41} & h_{31} \\ h_{42} & h_{32} \end{bmatrix} \Rightarrow h =$$

$$\begin{bmatrix} -32 \ dBm & -67 \ dBm \\ -65 \ dBm & -32 \ dBm \end{bmatrix} \Rightarrow h_{norm} = \begin{bmatrix} 0 \ dB & -35 \ dB \\ -33 \ dB & 0 \ dB \end{bmatrix}$$

$$\text{Mis-Aligned} \Rightarrow h = \begin{bmatrix} h_{41} & h_{31} \\ h_{42} & h_{32} \end{bmatrix} \Rightarrow h =$$

$$\begin{bmatrix} -35 \ dBm & -35 \ dBm \\ -35 \ dBm & -35 \ dBm \end{bmatrix} \Rightarrow h_{norm} = \begin{bmatrix} 0 \ dB & 0 \ dB \\ 0 \ dB & 0 \ dB \end{bmatrix}$$

It can be seen that aligning the orthogonal polarizations at the UE can decrease the unwanted cross-couplings by approximately 30 to 35 dB.

The results shown in FIG. 11 are for the situation where the orthogonality of the channel is −45° & 45. Line 320 (m8) shows the coupling from channel component 2 to antenna component 4, S42 or h42. Line 330 (m5) shows the coupling from channel component 1 to antenna component 3, S31 or h31. Line 300 (m6) shows the coupling from channel component 2 to antenna component 3, S32 or h32. Line 310 (m7) shows the coupling from channel component 1 to antenna component 4, S41 or h41.

The coupling (h matrix) between the different polarizations on the two different antennas are shown below:

$$\text{Aligned} \Rightarrow h = \begin{bmatrix} h_{31} & h_{41} \\ h_{32} & h_{42} \end{bmatrix} \Rightarrow h =$$

$$\begin{bmatrix} -33 \ dBm & -59 \ dBm \\ -70 \ dBm & -32 \ dBm \end{bmatrix} \Rightarrow h_{norm} = \begin{bmatrix} -1 \ dB & -26 \ dB \\ -37 \ dB & 0 \ dB \end{bmatrix}$$

$$\text{Mis-Aligned} \Rightarrow h = \begin{bmatrix} h_{31} & h_{41} \\ h_{32} & h_{42} \end{bmatrix} \Rightarrow h =$$

$$\begin{bmatrix} -37 \ dBm & -36 \ dBm \\ -36 \ dBm & -35 \ dBm \end{bmatrix} \Rightarrow h_{norm} = \begin{bmatrix} -2 \ dB & -1 \ dB \\ -1 \ dB & 0 \ dB \end{bmatrix}$$

It can be seen that aligning the orthogonal polarizations can decrease the unwanted cross-couplings by approximately 25 to 35 dB.

Polarization Alignment

Figure 12:
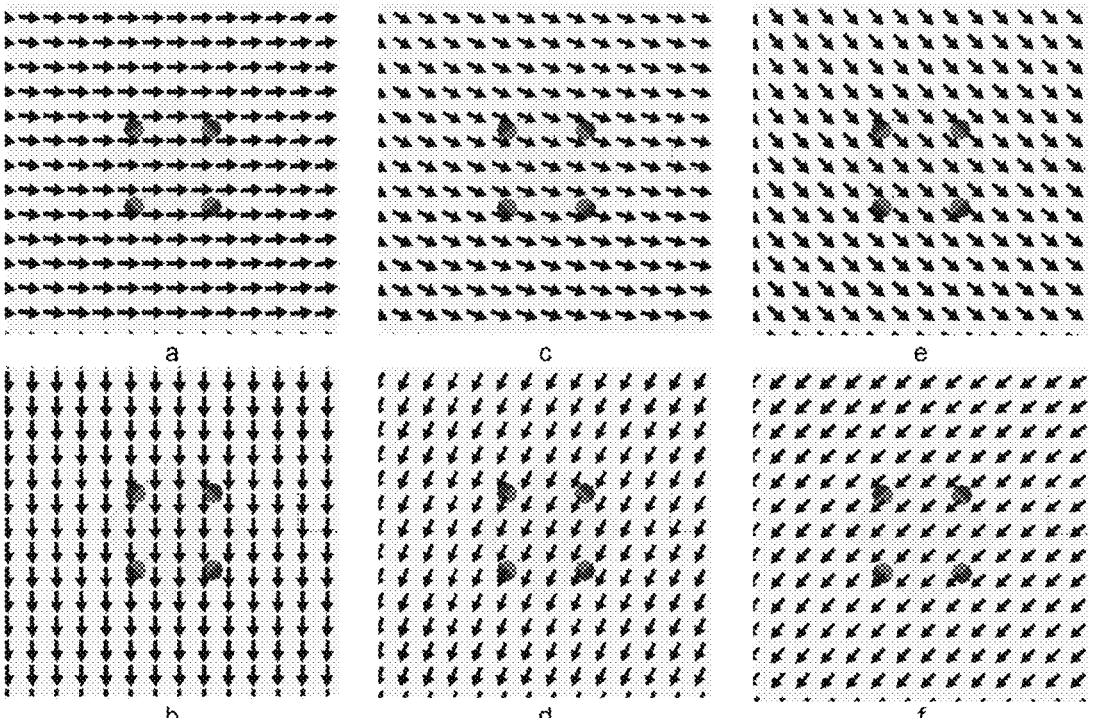
FIG. 12 illustrates polarization adjustment illustrated by H-field direction at a fixed phase and distance from the patch element.

The polarization alignment is illustrated in FIG. 12 as the orientation of the H-field at a fixed phase and distance from the patch antenna. The control of the orthogonal polarizations is shown where the orientation of the polarizations is adjusted from 0° to 45° while the orthogonality between the polarizations are kept. Patch Feed Ports (PFP) 100 & 120 are configured for Co-Pol f1&f2, while PFPs 110 & 130 are configured for Cross-Pol f1&2, as illustrated in FIG. 5A.

Equal power to Patch-Feed-Ports (PFP) 100 & 120 (*a*) and equal power to PFPs 110 & 130 (*b*).

8 dB less power on PFP 120 (*c*) and 8 dB less power on PFP 130 (*d*).

Full power to PFP 100 (*e*) and full power to PFP 110 (*f*).

Alternative Hardware Embodiment

Figure 13:
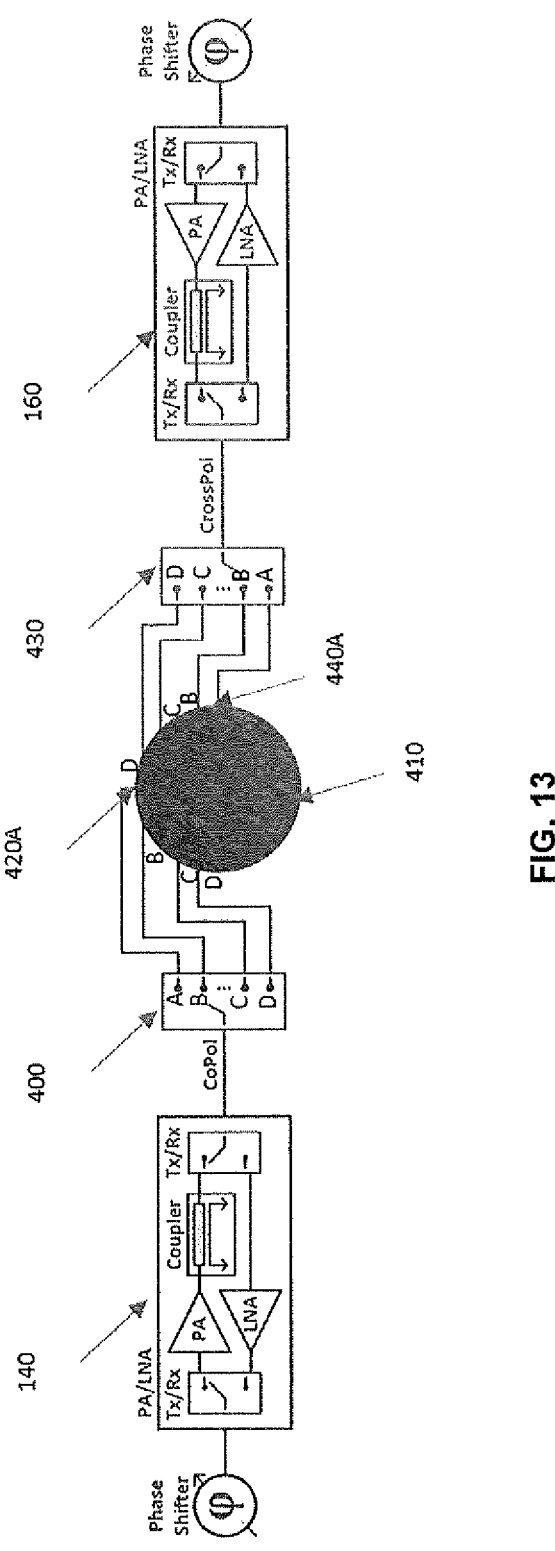
FIG. 13 illustrates circuitry for dynamic orientation control of orthogonal polarizations according to one example embodiment.

An alternative hardware example embodiment shown in FIG. 13, which is based on two SPxT switches and multiple feeding points on a circular or other shaped patch antenna. This arrangement is similar to the arrangement described with reference to FIGS. 5A & 5B but the change in orientation of the polarizations is instead achieved by the selection of different switch positions. The different switch positions select a specific feed point located at a specific location on the patch antenna which is connected to the RF circuits and so does not require pairs of RF circuits. In particular, a first switch 400 is positioned between RF circuitry 140 and a first plurality of feeds 420A-D on the patch antenna 410. A second switch 430 is positioned between RF circuitry 160 and a second plurality of feeds 440A-D on the patch antenna 410. The first switch 400 and the second switch 430 are switched to required positions to couple the RF circuitry 140, 160 with the appropriate feeds 420A-D, 440A-D to provide the required polarizations. It will be appreciated that the feed points are not required to be located at the edge of the patch antenna as illustrated schematically in FIG. 13 but can instead be located at any position on the patch antenna which provides the required polarisation.

An advantage of this approach is that it reduces the number of PA/LNA modules. Disadvantages of this approach are that it provides less polarization alignment granularity, which will result in more polarization cross-coupling (10 to 15 dB increased coupling can easily result from a coarse granularity), which again will lead to less throughput; and increase permanent insertion loss, due to the SPxT switch at the patch. It will be appreciated that the arrangement of FIG. 14 could be used in combination with the arrangement of FIG. 5A and/or FIG. 5B.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods. The term non-transitory as used herein, is a limitation of the medium itself (i.e., tangible, not a signal) as opposed to a limitation on data storage persistency (e.g. RAM vs ROM).

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although example embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus, comprising:

an antenna array of antenna elements having signal feeds configured to convey a pair of radio frequency signals related to a pair of polarised beams, wherein said pair of radio frequency signals comprise a first radio frequency signal related to a first beam polarised in a first orientation and a second radio frequency signal related to a second beam polarised in a second orientation; and circuitry coupled to the signal feeds and configured to vary a relative gain of said pair of radio frequency signals conveyed between said signal feeds and front end circuitry to vary a polarization orientation of said pair of polarised beams.

2. The apparatus of claim 1, wherein said circuitry is configured to vary said relative gain to at least one of vary said polarization orientation of both of said pair of polarised beams together or vary said polarization orientation of both of said pair of polarised beams together with a same angle or a different angle.

3. The apparatus of claim 1, wherein said circuitry is configured to vary the relative gain of said pair of radio frequency signals to at least one of vary said polarization orientation of both of said pair of polarised beams or vary said polarization orientation of both of said pair of polarised beams together with an angle of up to 45°.

4. The apparatus of claim 1, wherein said circuitry comprises transceiver circuitry configured to vary relative gain of amplifiers conveying said pair of radio frequency signals to vary said polarization orientation of said pair of polarised beams.

5. The apparatus of claim 1, wherein said circuitry is configured to split said first radio frequency signal into a pair of first radio frequency signals and to split said second radio frequency signal into a pair of second radio frequency signals, to vary a gain of one of said pair of first radio frequency signals relative to a gain of another of said pair of first radio frequency signals and to vary a gain of one of said pair of second radio frequency signals relative to a gain of another of said pair of second radio frequency signals to vary said polarization orientation of said pair of polarised beams by varying of a polarization of said first beam and a polarization of said second beam together.

6. The apparatus of claim 1, wherein said circuitry comprises:

a first pair of radio frequency circuits, the radio frequency circuits of the first pair coupled with a respective one of a first pair of feeds and configured to convey said first radio frequency signal between said first pair of feeds and said front end circuitry; and a second pair of radio frequency circuits, the radio frequency circuits of the second pair coupled with a respective one of a second pair of feeds and configured to convey said second radio frequency signal between said second pair of feeds and said front end circuitry, wherein said circuitry is configured to vary a relative gain within said first pair of radio frequency circuits and within said second pair of radio frequency circuits to vary a polarization orientation of a polarization of said first beam and to vary a polarization orientation of a polarization of said second beam.

7. The apparatus of claim 6, wherein said circuitry is configured to vary the relative gain of said pair of radio frequency signals at least by performing a reduction of gain of one of said first pair of radio frequency circuits compared to another of said first pair of radio frequency circuits and a reduction of gain of one of said second pair of radio frequency circuits compared to another of said second pair of radio frequency circuits to vary said polarization orientation of said polarization of said first beam and said polarization of said second beam.

8. The apparatus of claim 6, wherein said first pair of radio frequency circuits comprises a first circuit and a second circuit, said first circuit being coupled with a first co-polarisation feed and said second circuit being coupled with a second co-polarisation feed, and wherein said second pair of radio frequency circuits comprises a third circuit and a fourth circuit, said third circuit being coupled with a first cross-polarisation feed and said fourth circuit being coupled with a second cross-polarisation feed.

9. The apparatus of claim 8, wherein said fourth circuit comprises a 180° phase shifter configured to provide a 180° phase shift in its signal being conveyed.

10. The apparatus of claim 1, wherein said polarised beams are orthogonally-polarised beams.

11. The apparatus of claim 1, wherein said apparatus comprises user equipment or a base station, the user equipment or base station comprising circuitry configured to generate said radio frequency signals.

12. The apparatus of claim 1, wherein said antenna elements comprise a patch antenna in a diamond shape having said signal feeds located on a respective side of the patch antenna.

13. The apparatus of claim 1, wherein said circuitry is configured to vary said polarization orientation of said pair of polarised beams to match polarisations of a channel conveying said pair of radio frequency signals.

14. The apparatus of claim 1, wherein said circuitry comprises transceiver circuitry configured to vary relative gain of attenuators conveying said pair of radio frequency signals to vary said polarization orientation of said pair of polarised beams.

15. An apparatus, comprising:

an antenna array of antenna elements having signal feeds configured to convey a pair of radio frequency radio frequency signals related to a pair of polarised beams, wherein said pair of radio frequency signals comprise a first radio frequency signal related to a first beam polarised in a first orientation and a second radio frequency signal related to a second beam polarised in a second orientation; and circuitry coupled to the signal feeds and configured to convey said pair of radio frequency signals conveyed between said signal feeds and front end circuitry, said circuitry being configured to select between different signal feeds to vary a polarization orientation of said pair of polarised beams.

16. The apparatus of claim 15, wherein said signal feeds comprise a first plurality of signal feeds located to provide a first of said pair of polarised beams and a second plurality of signal feeds located to provide a second of said pair of polarised beams, said circuitry being configured to select one of said first plurality of signal feeds with which to convey said first radio frequency signal and to select one of said second plurality of signal feeds with which to convey said second radio frequency signal to vary an orientation of said pair of polarised beams.

17. The apparatus of claim 16, wherein said first plurality of signal feeds are located at positions at one antenna element of said antenna elements to provide a first polarisation and said second plurality of signal feeds are located at positions at said antenna element to provide a second polarisation, wherein said first polarisation is orthogonal to said second polarisation, and wherein said circuitry is configured to select one of said first plurality of signal feeds with which to convey said first radio frequency signal and to select one of said second plurality of signal feeds with which to convey said second radio frequency signal at an associated position.

18. The apparatus of claim 15, wherein said polarised beams are orthogonally-polarised beams.

19. The apparatus of claim 15, wherein said antenna elements comprise a patch antenna in a diamond shape having said signal feeds located on a respective side of the patch antenna.

20. The apparatus of claim 15, wherein said circuitry is configured to vary said polarization orientation of said pair of polarised beams to match polarisations of a channel conveying said pair of radio frequency signals.

* * * * *